United States Patent
Marheine

(10) Patent No.: US 6,835,309 B2
(45) Date of Patent: Dec. 28, 2004

(54) FILTER CARTRIDGE ASSEMBLY

(75) Inventor: Philip Charles Marheine, Rutherford (AU)

(73) Assignee: Filter Technology Australia Pty Ltd, New South Wales (AU)

( * ) Notice: Subject to any disclaimer, the term of this patent is extended or adjusted under 35 U.S.C. 154(b) by 0 days.

(21) Appl. No.: 10/482,306

(22) PCT Filed: Jul. 3, 2002

(86) PCT No.: PCT/AU02/00880

§ 371 (c)(1),
(2), (4) Date: Dec. 30, 2003

(87) PCT Pub. No.: WO03/004129

PCT Pub. Date: Jan. 16, 2003

(65) Prior Publication Data

US 2004/0168966 A1 Sep. 2, 2004

(51) Int. Cl.[7] .......................... B01D 29/54; B01D 27/14
(52) U.S. Cl. .................... 210/232; 210/323.2; 210/439; 210/483
(58) Field of Search .............................. 210/232, 323.2, 210/439, 483

(56) References Cited

U.S. PATENT DOCUMENTS

| 4,366,057 A | * | 12/1982 | Bridges et al. | ............. | 210/437 |
| 4,579,657 A | * | 4/1986 | Hood, Jr. | ..................... | 210/314 |
| 4,773,990 A | * | 9/1988 | Hood, Jr. | ..................... | 210/314 |
| 4,792,397 A | | 12/1988 | Rasmussen | | |

FOREIGN PATENT DOCUMENTS

| AU | 12391/95 | 5/1995 |
| EP | 0 556 506 | 8/1993 |

* cited by examiner

Primary Examiner—Thomas M. Lithgow
(74) Attorney, Agent, or Firm—Young & Thompson

(57) ABSTRACT

A filter cartridge assembly (10) including respective disposable elements (11) positioned either side of a three part reusable flow through spacer elements (12), the spacer elements (12) comprises three parts, opposed support sections (19) and (20) and an outer locator ring (21). The support sections (19) and (20) have filtrate flow through passages (22) and abutment flanges (23) which abut to provide radial flow through passages (24). Each of the supports (19) and (20) include circular ridges (25) and (26) at the inner and outer peripheral edges designed to push into the paper roll (16) while O-rings (27) and (28) provide seals between the supports (19) and (20) and the ring (21) and the outer body (13) of the respective elements (11).

7 Claims, 2 Drawing Sheets

FILTER CARTRIDGE ASSEMBLY

TECHNICAL FIELD OF THE INVENTION

THIS INVENTION relates to a filter cartridge assembly and in particular, but not limited to, a filter cartridge suitable for filtering oil or fuel.

BACKGROUND TO THE INVENTION

Filters are known that employ an outer filter body holding disposable filter cartridges, the outer body usually has a cylindrical housing and a cap, a coaxial return pipe usually has a threaded end and the cap screws onto the threaded end to clamp the cartridges in operative position in the housing. Liquid flows though an inlet, through filter media in the cartridges and out through the return pipe. Spent cartridges are simply exchanged with new ones. Typical cartridges are known that are made from a paper roll held in a plastics or metal cylinder. An example is described in WO/0037232. There are various alternative constructions and flow modalities used.

European patent application No. P 0 556 506A1 describes a modular filter system consisting of cartridges made from a tightly wrapped paper filter media retained in a plastic casing. The plastic casing has integrally formed grate-like configuration on its top and bottom surfaces to allow fluid to enter an exit the filter. The casing is also dimensioned to closely surround the paper media. The filter cartridges are stackable within the filter housing which can retain a plurality of cartridges thereby increasing the capacity of the filter. Each casing is made from identical top and bottom halves where the cylindrical walls clip together around the paper roll. When two cartridges are used the grid like top of one cartridge a butts the grid-like bottom of the other so that liquid flows from one cartridge to the next in series. Thus liquid flows one way, from one end only and is recovered out the other end. The central pipe in this case is an inlet pipe rather than a return pipe.

Other arrangements are known where liquid flows simultaneously into the filter in opposite directions and is recovered centrally, see for example Australian Patent 729523 and U.S. Pat. No. 4,792,397.

Australian Patent 729523 and WO/0037232 describe an injection moulded filter cartridge filled with a paper roll filter media. Unlike the cartridge of European patent application No. P 0 556 506A1, the cartridge is open ended and does not employ grate-like ends. This allows a press to be used to insert paper rolls under pressure. In one cartridge opposite ends of the cartridge are completely open so the cartridge is effectively a tube with two back-to-back paper rolls separated by gauze providing a return flow path. The paper rolls have a central bore made of cardboard for a return pipe. Thus when the cartridge is clamped inside a filter container liquid flows from an inlet in the container in both ends of the cartridge, through the paper rolls and is recovered by flowing out the ends of the paper rolls through a common return path formed by the gauze to the central return pipe. The gauze separates the confronting ends of the rolls and provides a flow path for the filtered liquid. Gauze is also used in the arrangement of Australian patent 659793 to separate two paper rolls in a metal cannister.

In U.S. Pat. No. 4,792,397 back-to-back paper rolls are used in a similar arrangement Australian Patent 729523 and WO/0037232 except instead of gauze being used to separate the rolls U.S. Pat. No. 4,792,397 uses a specially made fluid collector between the rolls. The fluid collector has closely spaced concentric ridges projecting from opposite sides of a substantially flat portion, pressure equalisation holes pass through the flat portion. The ridges push into the paper rolls on opposite sides of the collectors. Gaps in each ridge allows radial return flow to the central return pipe.

In Australian patent 650176 a metal canister is provided with end wall depressions to improve radial return flow. In Australian patent application 59243/00 a fluid collector is provided in an end wall of the housing, the fluid collector has lands in the form of sectors of a circle separated by radial flow passages.

The prevailing design criteria adopted in all these instances is to support the paper across its ends in an effort to maintain the return flow and minimise blockages that might impede flow as the paper collapses. Since the filters are pressurised as the filter media ages and becomes loaded it may distort in the region of the return flow leading to blockages. The gauze may become depressed by the paper being forced across the gap. Thus in the above examples it is usual to provide a substantial amount of support at the end of the paper roll with fluid collectors with relatively large flow paths being preferred to wire gauze.

The present invention adopts a completely different approach to the problem of supporting the roll while maintaining greater efficiency of return flow across the filter.

OUTLINE OF THE INVENTION

In one aspect the present invention resides in a filter cartridge assembly assembled form two disposable filter elements and spacer means holding the filter elements in separate spaced apart relationship, each filter element comprising an outer housing containing an annular paper core, characterised in that the spacer means comprises a reusable back-to-back filter element support means with through holes for flow of filtrate flowing through the annular paper core into the spacer means, the spacer means having cross flow passage means within said spacer means for inward flow of said filtrate for return through a return pipe, the spacer means being supported by a reusable outer locator ring in which the spacer means is located and which extends in opposite directions outside a peripheral marginal portion of the housings of the respective disposable filter elements.

Typically, the outer ring includes O-ring holders to hold sealing rings which seal the locator ring against the spacer and the peripheral marginal portions of the of the housings of filter elements.

Preferably, the spacers include upstanding outer ridges that penetrate peripheral portions of the paper core and there being on opposite sides of the spacer means a plurality of ridges that hold the paper roll and support it, defining transverse flow channels leading to said through holes promoting flow along the spacer in the channels to the spaced through holes.

Preferably, the spacer is made from two disc members having circumferentially spaced mating abutments, gaps between the abutments defining return flow through passage means.

BRIEF DESCRIPTION OF THE DRAWINGS

In order that the present invention can be more readily understood and be put into practical effect, reference will now be made to the accompanying drawings which illustrate a preferred embodiment of the invention and wherein.

METHOD OF PERFORMANCE

Figure 1:
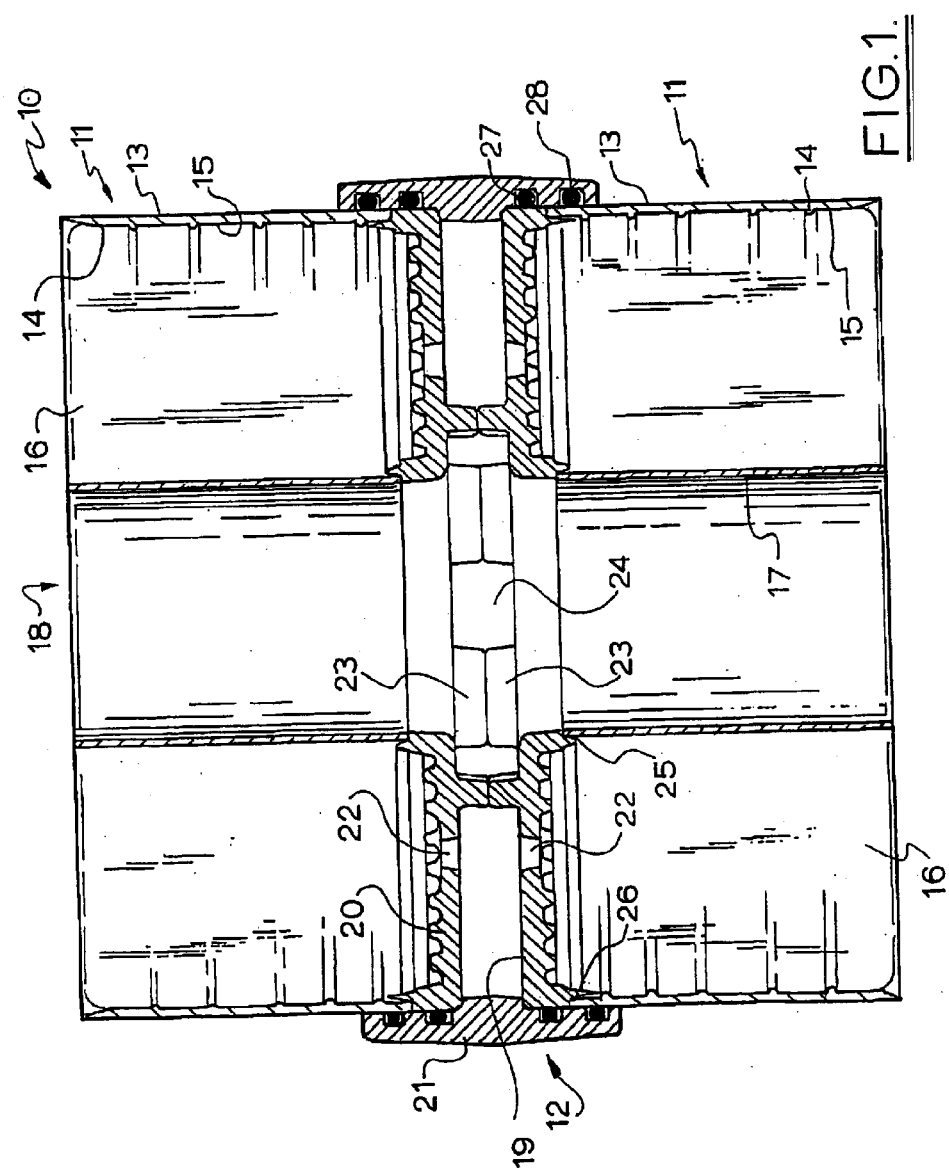
FIG. 1 is a section through a filter cartridge assembly according to the invention.
Figure 2:
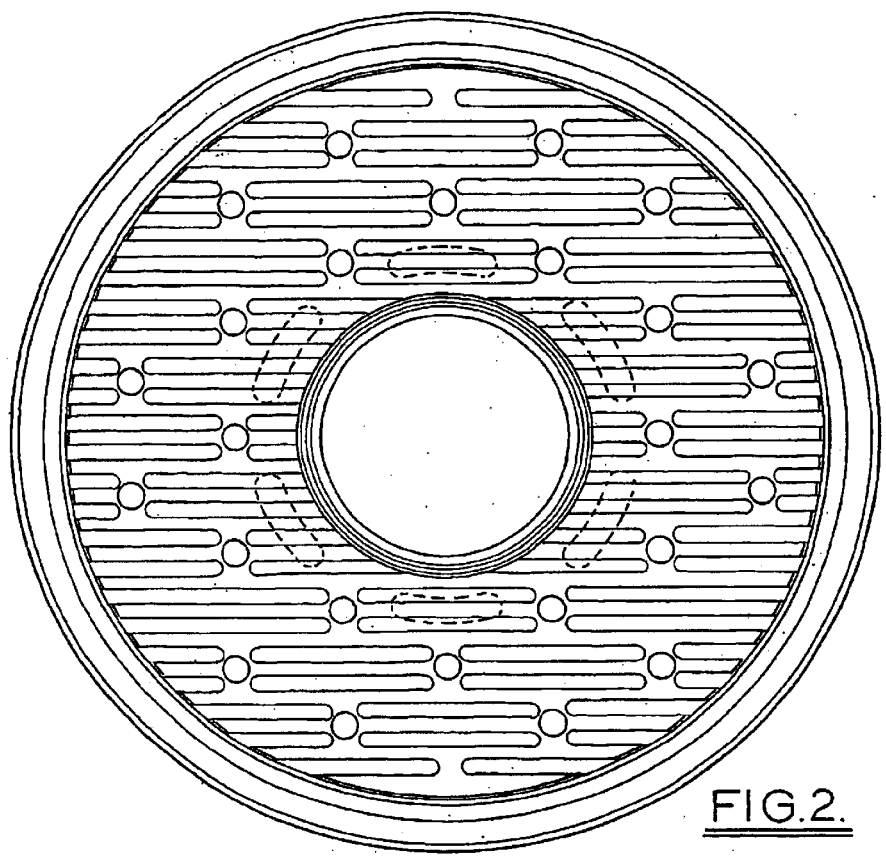
FIGS. 2 and 3 are respective plan and section views of a spacer and locator ring as assembled; whilst
Figure 3:
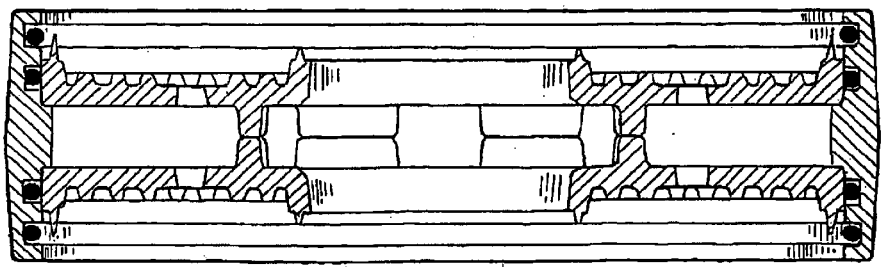
Figure 4:
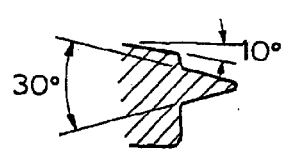
FIG. 4 is a detailed view of a typical outer circular ridge.

Referring to the drawings and initially to FIG. 1 there is illustrated a filter cartridge assembly 10 comprising respective disposable filter elements 11 positioned either side of a three part reusable flow through spacer means 12, each of the filter elements 11 comprises a hollow cylindrical plastics outer body 13 which has internal ribs 14 spaced along its inner surface 15 to provide an anti tracking function inhibiting flow along the interface between annular paper filters 16 and the outer body 13.

Annular paper roll filters 16 have been pushed, under compression, into the plastics outer bodies 13 of the respective elements 11. Each of the paper filters 16 has a central cylindrical cardboard core 17. Thus a complete passage is formed through the assembly at 18 so that a filtrate return pipe can be inserted through and also used to provide in conjunction with a filter housing (not shown) a clamp against opposite ends of the assembly to clamp the assembly together.

The spacer means 12 comprises three cast metal parts, opposed support sections 19 and 20 and an outer locator ring 21. The support sections 19 and 20 have filtrate flow through passages 22 and abutment flanges 23 which abut as shown providing radial flow through passages 24. This means that filtrate can flow through the paper filter 16, through the flow through holes at 22 and their associated surface flow channels and then radially through the apertures 24 to a return (not shown). Each of the supports 19 and 20 include circular ridges 25 and 26 at the inner and outer peripheral edges designed to push into the paper roll 16 while O-rings 27 and 28 provide seals between the supports 19 and 20 and the ring 21 and the outer body 13 of the respective elements 11.

Whilst the above has been given by way of illustrative example of the present invention many variations and modifications thereto will be apparent to those skilled in the art without departing from the broad ambit and scope of the invention as set out in the appended claims.

What is claimed is:

1. A filter cartridge assembly assembled from two disposable filter elements and spacer means holding the filter elements in separate spaced apart relationship, each filter element comprising an outer housing containing an annular paper core, characterised in that the spacer means comprises a reusable back-to-back filter element support means with through holes for flow of filtrate flowing through the annular paper core into the spacer means, the spacer means having cross flow passage means within said spacer means for inward flow of said filtrate for return through a return pipe, the spacer means being supported by a reusable outer locator ring in which the spacer means is located and which extends in opposite directions outside a peripheral marginal portion of the housings of the respective disposable filter elements.

2. A filter cartridge assembly according to claim 1 wherein the outer ring includes O-ring holders to hold sealing rings which seal the locator ring against the spacer means and the peripheral marginal portions of the of the housings of filter elements.

3. A filter cartridge assembly according to claim 1 wherein the spacer means includes upstanding outer ridges that penetrate peripheral portions of the paper core and there being on opposite sides of the spacer means a plurality of ridges that hold the paper roll and support it, defining transverse flow channels leading to said through holes promoting flow along the spacer in the channels to the spaced through holes.

4. A filter cartridge assembly according to claim 1 wherein the spacer means is made from two disc members having circumferentially spaced mating abutments, gaps between the abutments defining return flow through passage means.

5. A filter cartridge assembly according to claim 1 wherein the outer ring includes O-ring holders to hold sealing rings which seal the locator ring against the spacer and the peripheral marginal portions of the of the housings of filter elements, the spacer including upstanding outer ridges that penetrate peripheral portions of the paper core and there being on opposite sides of the spacer means a plurality of ridges that hold the paper roll and support it, the ridges defining transverse flow channels leading to said through holes promoting flow along the spacer in the channels to the spaced through holes.

6. A filter cartridge assembly according to claim 1 wherein the outer ring includes O-ring holders to hold sealing rings which seal the locator ring against the spacer means and the peripheral marginal portions of the of the housings of filter elements, the spacer means being two disc members having circumferentially spaced mating abutments, gaps between the abutments defining return flow through passage means.

7. A filter cartridge assembly according to claim 1 wherein the spacer means includes upstanding outer ridges that penetrate peripheral portions of the paper core and there being on opposite sides of the spacer means a plurality of ridges that hold the paper roll and support it, the ridges defining transverse flow channels leading to said through holes promoting flow along the spacer in the channels to the spaced through, the spacer means comprising two disc members having circumferentially spaced mating abutments, gaps between the abutments defining return flow through passage means.

* * * * *

UNITED STATES PATENT AND TRADEMARK OFFICE
CERTIFICATE OF CORRECTION

PATENT NO. : 6,835,309 B2  Page 1 of 1
DATED : December 28, 2004
INVENTOR(S) : Philip Charles Marheine It is certified that error appears in the above-identified patent and that said Letters Patent is hereby corrected as shown below:

<u>Title page,</u>
Item [30], Foreign Application Priority Data, should read as follows
-- [30]     Foreign Application Priority Data Jul. 3, 2001     (AU)………………………………..PR6092 --.

Signed and Sealed this

Nineteenth Day of April, 2005

JON W. DUDAS
*Director of the United States Patent and Trademark Office*